US010428707B2

(12) United States Patent
Fritz et al.

(10) Patent No.: US 10,428,707 B2
(45) Date of Patent: Oct. 1, 2019

(54) PARTIAL-FLOW DIESEL PARTICULATE FILTER USING PRESSURE REGULATED BYPASS

(71) Applicant: SOUTHWEST RESEARCH INSTITUTE, San Antonio, TX (US)

(72) Inventors: Steven G. Fritz, San Antonio, TX (US); John C. Hedrick, Boerne, TX (US)

(73) Assignee: Southwest Research Institute, San Antonio, TX (US)

( * ) Notice: Subject to any disclaimer, the term of this patent is extended or adjusted under 35 U.S.C. 154(b) by 434 days.

(21) Appl. No.: 14/189,845

(22) Filed: Feb. 25, 2014

(65) Prior Publication Data

US 2015/0240681 A1    Aug. 27, 2015

(51) Int. Cl.
*F01N 3/031*   (2006.01)
*F01N 3/10*    (2006.01)
(Continued)

(52) U.S. Cl.
CPC .......... *F01N 3/031* (2013.01); *F01N 3/103* (2013.01); *F01N 13/011* (2014.06); *F01N 3/035* (2013.01);
(Continued)

(58) Field of Classification Search
CPC ........ F01N 13/011; F01N 3/031; F01N 3/103; F01N 2560/08; F01N 2590/08; F01N 2900/0416; F01N 3/035
(Continued)

(56) References Cited

U.S. PATENT DOCUMENTS 4,319,453 A * 3/1982 Mann ................ F01N 3/02
                                              55/314
5,620,490 A   4/1997 Kawamura
(Continued)

OTHER PUBLICATIONS

Code of Federal Regulations / Title 40—Protection of Environment; vol. 31, Jul. 1, 2008, 4 pgs; downloaded from web Jan. 8, 2013; http://www.gpo.gov/fdsys/pkg/CFR-2008-title40-vol31/xml/CFR-2008-title40-vol31-sec10.
(Continued)

*Primary Examiner* — Jason D Shanske
*Assistant Examiner* — Matthew T Largi
(74) *Attorney, Agent, or Firm* — Gross, Tucker, Perreault & Pfleger, PLLC

(57) ABSTRACT

A system and method for particulate matter reduction. A diesel particulate filtration system includes an inlet, an outlet, an exhaust path between the inlet and the outlet, a diesel particulate filter positioned in the exhaust path between the inlet and the outlet, and a bypass valve, wherein the diesel particulate filtration system is configured to have a diesel engine operatively coupled to the inlet. The bypass valve being configured to open when a maximum allowable engine backpressure is exceeded. When the bypass valve is closed, exhaust gas including particulate matter passes through the diesel particulate filter. When the bypass valve is open, a portion of the exhaust gas passes through the diesel particulate filter and the remainder of the exhaust gas passes through the bypass valve and at least 40 percent of said particulate matter is removed from said exhaust gas.

21 Claims, 13 Drawing Sheets

(51) Int. Cl.
*F01N 13/00* (2010.01)
*F01N 3/035* (2006.01)

(52) U.S. Cl.
CPC ...... *F01N 2560/08* (2013.01); *F01N 2590/08* (2013.01); *F01N 2900/0416* (2013.01); *Y02T 10/20* (2013.01)

(58) Field of Classification Search
USPC .................................................. 60/311, 324
See application file for complete search history.

(56) References Cited

U.S. PATENT DOCUMENTS

| | | | | |
|---|---|---|---|---|
| 6,660,068 | B1* | 12/2003 | Garner | B01D 46/0032 55/282.3 |
| 6,820,417 | B2* | 11/2004 | May | F01N 13/011 422/169 |
| 7,059,278 | B2 | 6/2006 | Hedrick et al. | |
| 7,171,801 | B2* | 2/2007 | Verkiel | F01N 13/0097 60/286 |
| 2002/0029548 | A1* | 3/2002 | Ohno | B01D 53/9454 55/282.3 |
| 2004/0226287 | A1* | 11/2004 | Edgar | F01N 3/023 60/295 |
| 2005/0160722 | A1* | 7/2005 | Shih | F01N 3/0842 60/288 |
| 2007/0175203 | A1* | 8/2007 | Roozenboom | F01N 3/025 60/285 |
| 2008/0155968 | A1* | 7/2008 | Salemme | F01N 3/035 60/288 |
| 2008/0289321 | A1* | 11/2008 | Lu | F01N 3/0842 60/299 |
| 2010/0071354 | A1 | 3/2010 | Brahma | |
| 2011/0314794 | A1 | 12/2011 | Geyer | |
| 2013/0101471 | A1* | 4/2013 | Yacoub | F01N 3/103 422/168 |
| 2014/0109571 | A1* | 4/2014 | Primus | F02B 37/18 60/605.2 |
| 2014/0116027 | A1* | 5/2014 | Ancimer | F01N 3/2053 60/274 |

OTHER PUBLICATIONS

Diesel Retrofit in Europe: Diesel Particulate Filters (DPF), 2 pgs; downloaded from web May 3, 2013; http://www.dieselretrofit.eu/technologies_filters.html.
DieselNet: Emission Standards: USA: Locomotives, (3 pgs); downloaded from web Jan. 8, 2013; http://www.dieselnet.com/standards/us/loco.php.
DCL International Inc., MINE-X Flow-Through Filter (2 pgs).
Johnson Matthey Catalysts—Emission Control Technology—Diesel Particulate filter (DPF) (1 pg); downloaded from web May 3, 2013 http://ect.jmcatalysts.com/emission-control-technologies-diesel-particulate-filter-DPF.
Particulate-Filter-Facts.com, Partial Flow Filters, (2 pgs); downloaded from web May 3, 2013; http://www.partikelfilter-fakten.de/en/startpage/nebenstromfilter.html.
Primus, Design Challenges of Locomotive Diesel Engines, (6 pgs); GE Global Research Center, 11th Diesel Engine Emissions Reduction Conference, Chicago, IL, Aug. 24, 2005.
Schaffner, et al; Engine Technology, "Diesel Particulate filter: Exhaust Aftertreatment for the Reduction of Soot Emissions", (6 pgs), www.mtu-online.com.
Zhang; Diesel Emission Technology—Part II of Automotive Aftertreatment System, (10 pgs), www.bowmannz.com.

* cited by examiner

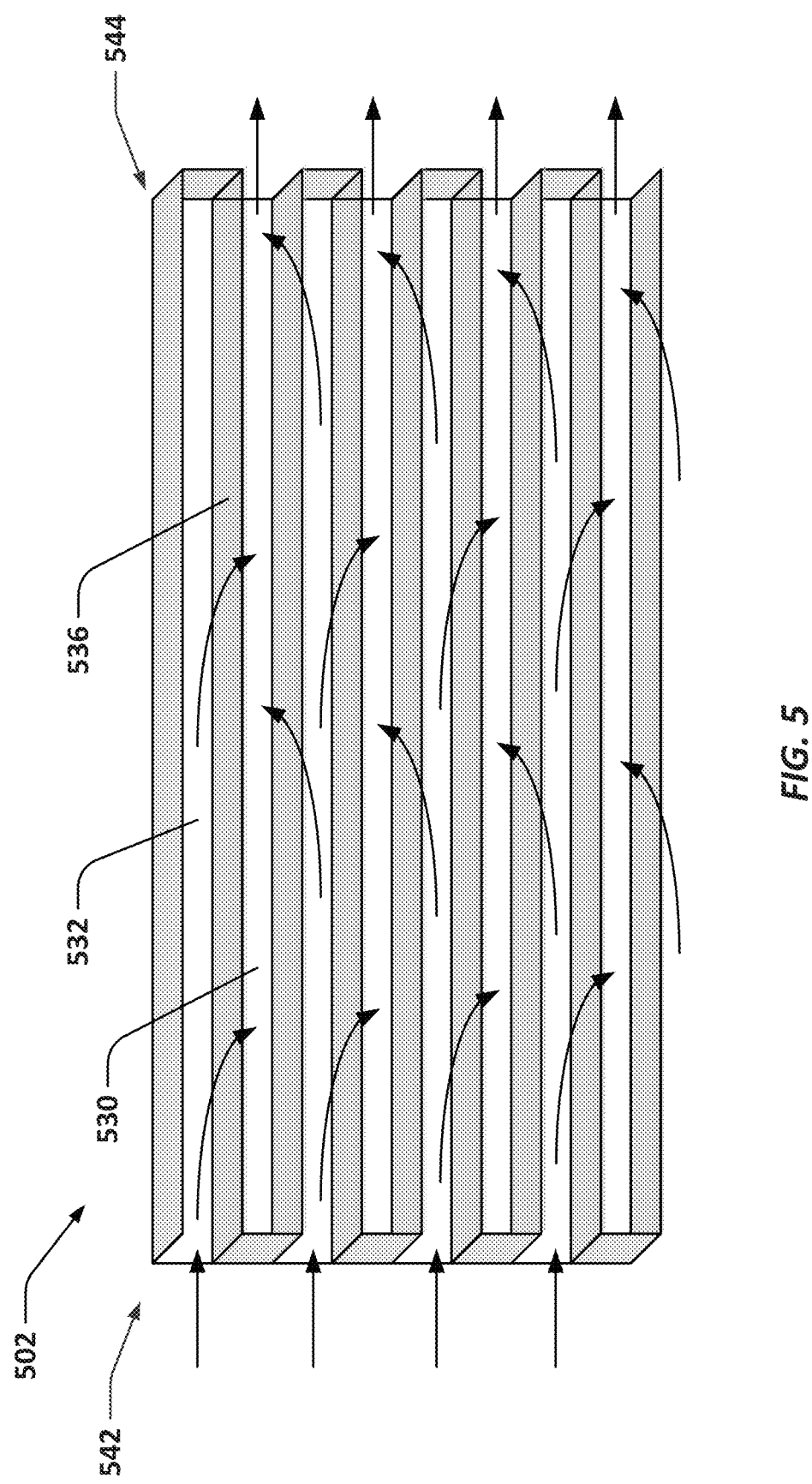

PARTIAL-FLOW DIESEL PARTICULATE FILTER USING PRESSURE REGULATED BYPASS

FIELD OF INVENTION

The present disclosure relates to diesel particulate filters, wherein a pressure regulated bypass is employed, limiting exhaust backpressure on a diesel engine.

BACKGROUND

Diesel particulate filters are one of multiple components used to control emissions produced during the operation of diesel engines. The diesel particulate filter removes particulate matter, or soot, from the exhaust gas of a diesel engine. While diesel particulate filters have commonly been used in on-highway truck applications in the U.S. since 2007, their use in larger diesel engines, such as in off-highway equipment, locomotive and marine applications are relatively limited. Regulatory changes, however, have reduced the allowable levels of particulate matter in exhaust from new engines over certain duty cycles using certain testing procedures. This reduction is now fostering the use of diesel particulate filters in relatively large engine applications.

Two types of diesel particulate filters, partial flow (or flow through filters) and wall flow filters, are generally available. In flow through filters exhaust gas is directed through a metal fiber fleece by scoop shaped metal foils. The particulate adheres to the metal fleece. The filtration efficiency of such filters is understood to be in the range of 40 percent to 60 percent. Wall flow filters include channels having closed inlets with open outlets and channels having open inlets with closed outlets, the porous channel walls being formed filters. Exhaust gas enters the open ended channels and passes through the filter walls into channels having open outlets. The filtration efficiency of wall flow filters is understood to be greater than 90 percent. However, for a given area, wall flow filters exhibit a greater backpressure as compared to partial flow filters.

A number of technical challenges are faced when high filtration efficiency, wall flow, diesel particulate filters are applied to off-highway, locomotive or marine applications. For example, one challenge is that standard wall flow diesel particulate filter elements, produced today for typical on-highway or off-highway applications, will only handle 350 to 400 horsepower (HP) per diesel particulate filter element. Another challenge is that simply scaling up diesel particulate filters for 350 HP to 400 HP trucks to those necessitated by 2,000 HP to 8,000 HP off-highway, locomotive, or marine engine applications result in wall flow filters that are larger than what can be produced with today's manufacturing technology.

To overcome such challenges multiple large wall flow diesel particulate filters sized at 350 to 400 horsepower per filter element have been employed in a single large housing or in a gang of single element housings. In both cases the diesel particulate filter elements are mounted in parallel, so that they can handle the high exhaust flow rates. However, such housings often are too large to practically fit in a locomotive car body, marine engine compartment, or off-highway equipment body.

Other potential issues include the plugging of diesel particulate filters due to an increase in the rate of particulate matter generation under certain operating conditions. Accordingly, there remains a need to improve upon diesel particulate filtration systems and particularly systems used in applications, such as off-highway, locomotive and marine applications, where changes in operating conditions may substantially alter the performance of the filters.

SUMMARY

An aspect of the present disclosure relates to a system for particulate matter reduction. The system includes a diesel particulate filtration system, wherein the diesel particulate filtration system includes an inlet, an outlet, and an exhaust path between the inlet and the outlet. The system further includes a diesel particulate filter positioned in the exhaust path between the inlet and the outlet. In addition, the system includes a bypass valve. The diesel particulate filtration system is configured to have a diesel engine having a horsepower of 500 or greater operatively coupled to the inlet and the diesel particulate filter element(s) has a total volume that is less than 1.9 times a swept volume of the diesel engine. Further the bypass valve is configured to open when a maximum allowable engine backpressure is exceeded. When the bypass valve is closed, exhaust gas, including particulate matter, passes through the diesel particulate filter(s) and at least 90 percent of the particulate matter is removed from the exhaust gas, and when the bypass valve is open, a portion of the exhaust gas passes through the diesel particulate filter(s) and the remainder of the exhaust gas passes through the bypass valve wherein at least 40 percent of the particulate matter is removed from the exhaust gas.

Another aspect of the present disclosure relates to a method of reducing particulate matter. The method includes operating a diesel engine having a horsepower of 500 or greater. The diesel engine is operatively coupled to an inlet of a diesel particulate filtration system, and the diesel particulate filtration system further includes an outlet, an exhaust path between the inlet and the outlet, diesel particulate filter(s) positioned between the inlet and the outlet, and a bypass valve. Further, the diesel particulate filter element(s) has a total volume that is less than 1.9 times a swept volume of the diesel engine. The method also includes directing exhaust gas including particulate matter generated by the diesel engine through the exhaust path, determining backpressure in the exhaust path between the inlet and the diesel particulate filter(s) with a sensor; and opening the bypass valve when the backpressure is determined to be above a maximum allowable engine backpressure, wherein at least 40 percent of the particulate material is removed from the exhaust gas.

BRIEF DESCRIPTION OF DRAWINGS

The above-mentioned and other features of this disclosure, and the manner of attaining them, may become more apparent and better understood by reference to the following description of embodiments described herein taken in conjunction with the accompanying drawings, wherein:

FIG. 5 illustrates a cross-section of an embodiment of a wall-flow filter for use in a diesel particulate filter system;

DETAILED DESCRIPTION

Figure 1:
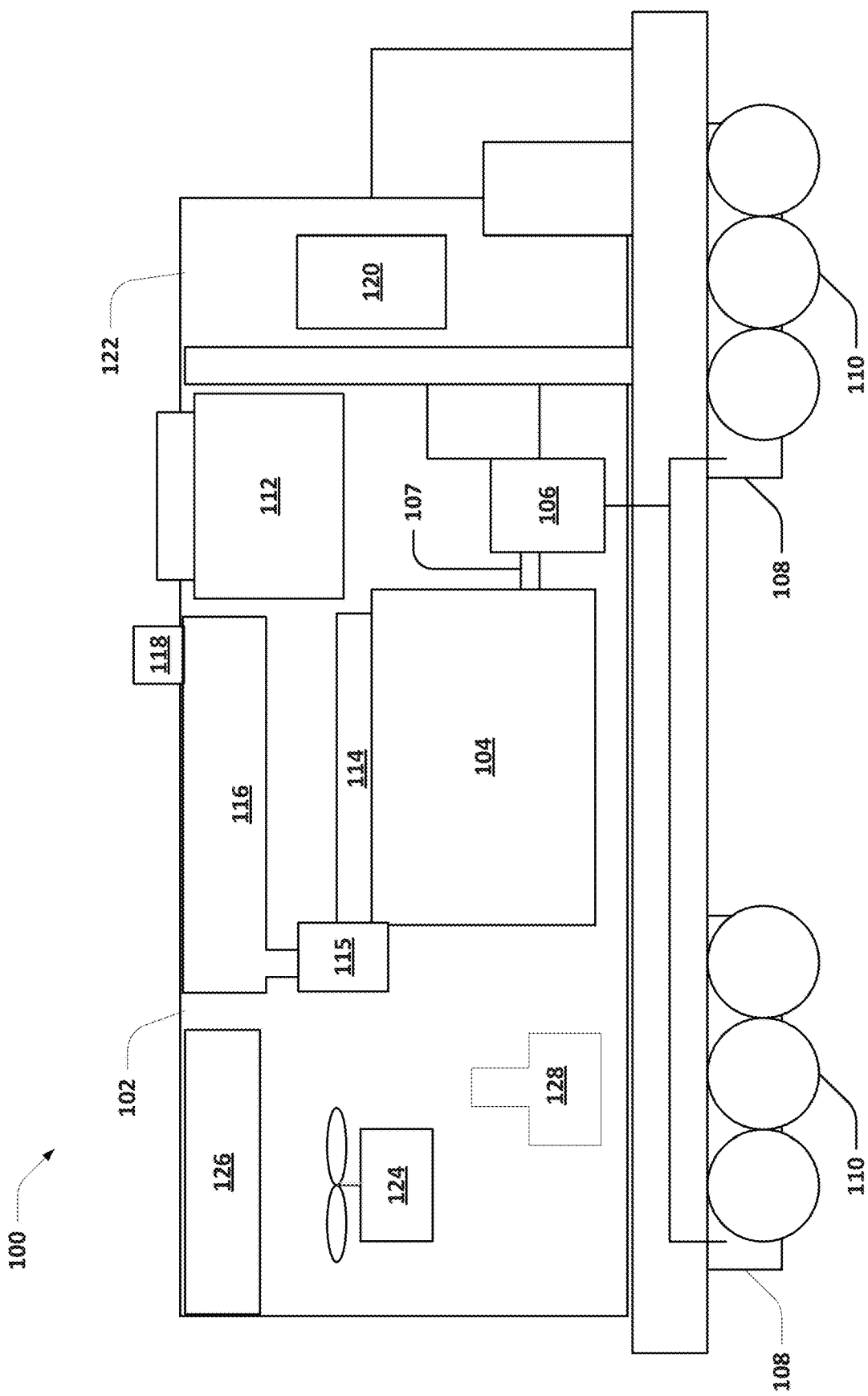
FIG. 1 illustrates a schematic of an embodiment of a diesel locomotive.

The present disclosure relates to diesel particulate filters, wherein a pressure regulated bypass is employed limiting exhaust backpressure on a diesel engine. In embodiments, the diesel engine exhibits a horse power of 500 or greater, and preferably from 2,000 HP to 8,000 HP. The bypass may be an internally regulated bypass, which allows unfiltered exhaust to pass though the filter housing, or an externally regulated bypass, which allows unfiltered exhaust to pass directly into the environment. Alternatively, or additionally, the bypass exhaust is routed through a diesel oxidation catalyst (DOC), mounted upstream or downstream of the bypass valve. The DOC may then reduce the particulate matter (PM) emissions of the otherwise unfiltered bypass exhaust. The systems described herein allow for greater filtration efficiency at idle and lower loads as well as backpressure regulated filtration at relatively high loads. This results in a relatively more compact diesel particulate filter (DPF) system.

Diesel particulate matter may be understood as soot, i.e., carbon particles. Various chemical compounds, including unburned or partially burned hydrocarbons, aldehydes, sulfates, sulfur dioxide, and combinations thereof, accumulate or adsorb onto the soot. Diesel particulate matter generally exhibits a size in the range of 10 nanometers to 1 µm, including all values and ranges therein. The fine and ultra-fine particles that make up diesel particulate matter are of particular concern as the particles may cause irritation to the respiratory system and eyes, and are considered a likely carcinogen. Diesel particulate filters are designed to capture or reduce diesel particulate matter in diesel engine exhaust.

An aspect of the present disclosure relates to a system for particulate matter reduction. The system includes a diesel particulate filtration system, which includes an inlet and outlet, an exhaust path between the inlet and the outlet and diesel particulate filters positioned between the inlet and the outlet. In embodiments, the diesel particulate filtration system is configured to have a diesel engine having a horsepower of 500 or greater, such as in the range of 500 HP to 8,000 HP and preferably in the range of 2,000 HP to 6,000 HP cooperatively coupled to the inlet and the diesel particulate filters has a total filter volume that is less than the typical 1.9 times the swept volume of the engine, described further herein. A bypass valve, mounted in the exhaust system in parallel with the diesel particulate filters, which is opened at the maximum allowable engine backpressure and the flow area of the valve is adjusted to maintain the engine exhaust backpressure at the maximum allowable engine backpressure limit.

When the bypass valve is closed, the exhaust gas including particulate matter passes through the diesel particulate filter and at least 90 percent of the particulate matter is removed from the exhaust gas by the diesel particulate elements in the exhaust stream. When the bypass valve opens to maintain the target engine backpressure, a portion of the exhaust gas passes through the diesel particulate filter and the remainder of the exhaust gas passes through the parallel flow bypass valve. The overall size of the DPF system, with the bypass valve installed, is dependent on one or more of the following factors: horsepower rating of the engine, the maximum allowable backpressure allowed by the engine manufacture, the particulate matter emissions level that the system must meet, the engine out PM emissions level, and the selection of the DPF elements and the pressure drop across these DPF elements and the housing.

In additional or alternative embodiments, a diesel oxidation catalyst (DOC) upstream or downstream of the bypass valve is employed. The bypass exhaust gas passes through the DOC to reduce the soluble organic fraction of the PM emissions. While the DOC will not reduce the PM emissions as much as a DPF element, the installation of the DOC in the portion of the exhaust stream that flows through the bypass valve exhaust stream may provide a much lower backpressure than a DPF element; reduce the PM emissions when there is exhaust flowing through the bypass valve; and help reduce the overall "systems" PM emissions. Installation of the DOC before the outlet and closer to the engine increases the temperature of the environment around the DOC, which in turn allows the DOC catalyst to hit the required activation temperature sooner.

While the system described herein can be used on any engine size, in preferred embodiments, the system is employed on medium speed engines that are primarily used in large engine applications such as locomotive, marine, and stationary power applications. The use of diesel particulate filters for large diesel engine applications has been fostered by, among other driving forces, government regulation. For example, U.S. EPA "Tier 4" regulations for new locomotives become effective on Jan. 1, 2015, which require all new locomotives to have particulate matter levels below 0.03 grams per horsepower-hour over applicable locomotive duty cycles and testing procedures. This is a 70 percent reduction in particulate matter levels of the "Tier 3" standards that are currently in place. The use of diesel particulate filters to meet these PM emission standards is hampered by a number of technical challenges. For example, current manufacturing technology is understood to produce a diesel particulate filter elements that are individually large enough to filter the exhaust from engines that produce less than roughly 400 horsepower. Another challenge includes a limited amount of space to accommodate multiple diesel particulate filters within the engine compartment or the locomotive car body.

Further, mission reliability can be an issue if the diesel particulate filter becomes plugged and the engine cannot be safely operated.

The system described herein provides for the use of multiple diesel particulate filter elements, which can be produced with current manufacturing technology, while maintaining engine exhaust backpressure, with a smaller diesel particulate filter housing volume. For example, the total external envelope for locomotives is set forth in the Association of American Railroads (AAR) "Plate L" clearance diagram, so that the locomotive may fit under bridges or through tunnels. Using diesel particulate filter technology employed in 350 HP to 400 HP truck systems for 2,000 HP to 8,000 HP engine systems results in diesel particulate filter package sizes that are relatively large and possibly impractical for the available space in a locomotive car body. Similar space challenges exist in marine engine compartment and off-highway equipment. Stated another way, scaling up the size of a diesel particulate filter based on horsepower would result in the use of multiple filters that would be difficult to fit, if it could be fit at all, in the allowable total external envelope allotted for the engine compartment of most equipment.

Another technical challenge includes diesel particulate filter regeneration, used to combust diesel particulate matter, including carbon and organic components, trapped in the filter. Regeneration systems are commonly either "passive" or "active".

Passive regeneration systems include catalytic coatings on the diesel particulate filter. In addition, a $NO_2$ producing diesel oxidation catalyst upstream of the diesel particulate filter may be employed. The $NO_2$ is used as an oxidizer to reduce the regeneration temperature of the diesel particulate filter. In passive regeneration systems, the duty-cycle of the engine application must result in sufficiently high exhaust temperatures for the oxidation of trapped particulate matter.

At idle and light engine loads, the exhaust may not be hot enough for passive diesel particulate filter regeneration. However, given that light engine loads and idling often occur in populous, urban areas, relatively high particulate matter filtration efficiency may be considered highly desirable. In addition, the passive regeneration rate must be greater than the increase in particulate matter mass over a given period of time. Otherwise, the diesel particulate filter element(s) will become plugged.

Active diesel particulate filter regeneration employees, in some instances, hydrocarbon injection into the exhaust upstream of the diesel oxidation catalyst, a diesel burner, an electrical heater in the exhaust or within the diesel particulate filter itself, or an external load inducement system on the engine. Active regeneration strategies are intended to increase the exhaust temperature on demand to a level sufficient for diesel particulate filter regeneration. However, such strategies may require the use of additional fuel, fuel borne catalysts, and or additional equipment complexity.

Regardless, it is possible that a diesel particulate filter may overload with particulate matter resulting in excessive engine exhaust backpressure and eventually causing the engine to shut-down due to the excessive backpressure or the backpressure can cause damage to either the diesel particulate filter or engine. Examples of conditions that may result in such overload include long tunnel operations where combustion may be inefficient, particularly at high altitudes, or extended idling in cold weather, where passive regeneration may not be efficient enough to keep up with the PM being deposited in the DPF elements. Engine malfunctions, such as injector, or excessive inlet air restriction (plugged intake air filters), or turbocharger failure, may also cause relatively high particulate matter levels.

Provided herein are systems and methods of filtering diesel particulate matter and adjusting the configuration of the systems to reduce engine backpressure. An embodiment of a diesel locomotive is illustrated in FIG. 1. The diesel locomotive 100 includes a diesel engine compartment 102. In examples, a diesel engine compartment may be 12 to 25 feet long by 3 to 7 feet wide by 7 to 13 feet high, such as 18 to 19 feet long, 5 to 6 feet wide and 10 to 11 feet high. Within the diesel engine compartment 102 is a diesel engine 104 that drives an alternator or generator 106 via a coupling 107 between the engine 104 and generator 106. The diesel engine has a horsepower of 500 HP or greater, such as in the range of 2,000 HP to 8,000 HP and preferably in the range of 4,000 HP to 6,000 HP and more preferably from 4,500 HP to 6,000 HP. The alternator (or generator) 106 generates electricity which is used to power traction motors 108 that drive the wheels 110. Intake air for the locomotive engine is drawn in through a series of air intakes 112, which pulls air into the locomotive compartment from outside the compartment. An exhaust manifold 114 is provided to capture exhaust from the engine 104, which directs the exhaust to the turbocharger 115. On the outlet of the turbocharger is fitted a diesel particulate filtration system 116 described further below. The turbocharger 115 is operatively coupled to the diesel engine, which is understood as being affixed to the engine in a manner to receive exhaust gas from the engine. After the diesel particulate filtration, the exhaust is passed through an outlet 118 and released from the engine compartment 102. The locomotive engine is controlled by electronic controls 120 that are present in the car body 122. Additional components that may also be present, but are not illustrated, include an auxiliary alternator, motor blowers, rectifiers, inverters, electronic control housing, a control stand, batteries, pinion gears, a fuel tank, air reservoirs, air compressor 128, drive shaft(s), gear box(es), radiator 126 and radiator fan(s) 124, sand box, truck frame, etc.

The diesel engine is controlled by a notched throttle. In embodiments, there are 9 notch positions, including idle and 8 power notches. Alternatively, fewer or greater notch positions are available, such as for example, notches 1 to 4 or notches 1 to 19. Further, low idle and one or more dynamic braking notches may also be provided. At idle, low idle, and dynamic braking notches, the traction motors may not be connected to the main traction alternator and the traction alternator's field windings are not energized. At notch 1, the traction motors become connected to the main traction alternator and the field coils are excited, resulting in motion. Each increase in notch leads to an increase in the engine power output. Notch 8 generally represents the rated engine speed, load, and power.

Figure 2:
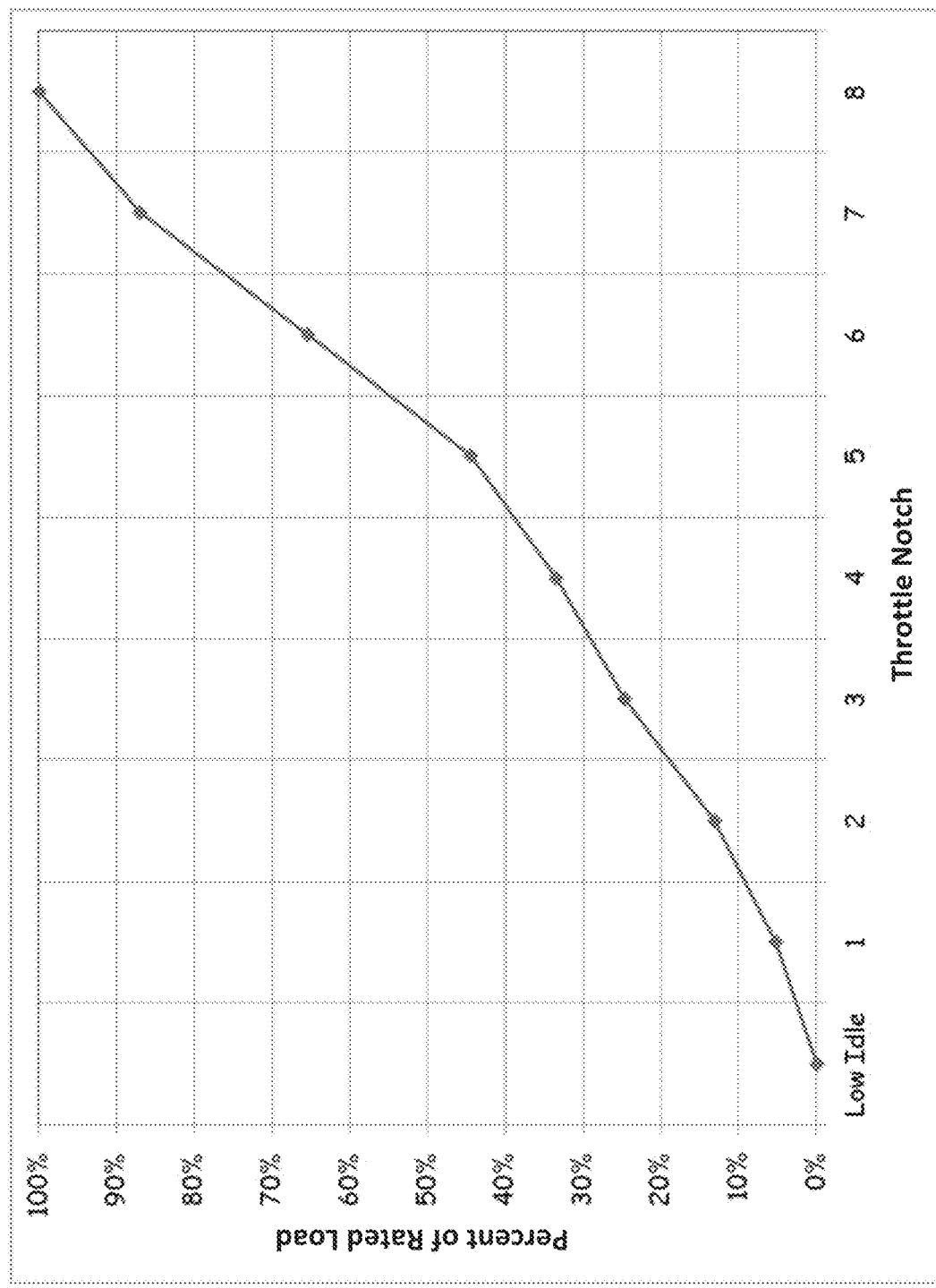
FIG. 2 illustrates an embodiment of a graph of a typical throttle notch value versus the percent of rated load.

An embodiment of a typical power curve for a diesel locomotive is illustrated in FIG. 2. This curve is similar to that of, for example, an ELECTRO-MOTIVE DIESEL (EMD) locomotive engine. As seen in this figure, at low idle, while the engine is running, and a low RPM, the engine operates at a low load, near 0 percent of the rated power of the engine. Notch 1 operation is approximately 5 percent of the rated power, notch 2 operation is approximately 12 percent of the total rated power, notch 3 operation is approximately 25 percent of the total rated power, notch 4 operation is approximately 33 percent, notch 5 operation is approximately 45 percent of the total rated power, notch 6 operation is approximately 65 percent of the total rated power, notch 7 operation is approximately 87 percent of the total rated power, and notch 8 operation is 100 percent of the total rated power. It is appreciated however, that for a given engine having 9 total notches, the specific power for any given notch value may vary depending on the locomotive model. Furthermore, for engines with additional, or fewer notches, the notch values may be split up somewhat differently. Reference to "low load" herein is understood as operation at engine power of 40 percent of the total rated power or less, including all values and ranges between 1 percent and 40 percent. Reference to "high power" herein is understood as operation at an engine load of greater than 40 percent of the total rated power, including all values and ranges between 41 percent to 100 percent. The percentage of rated power may then correlate to horsepower as described further below. In alternative embodiments, the diesel engine may include a ratchet throttle or other throttle mechanisms. Regardless, operation may occur at lower and higher power, wherein again, at low power operation is at or below 40 percent.

Figure 3A:
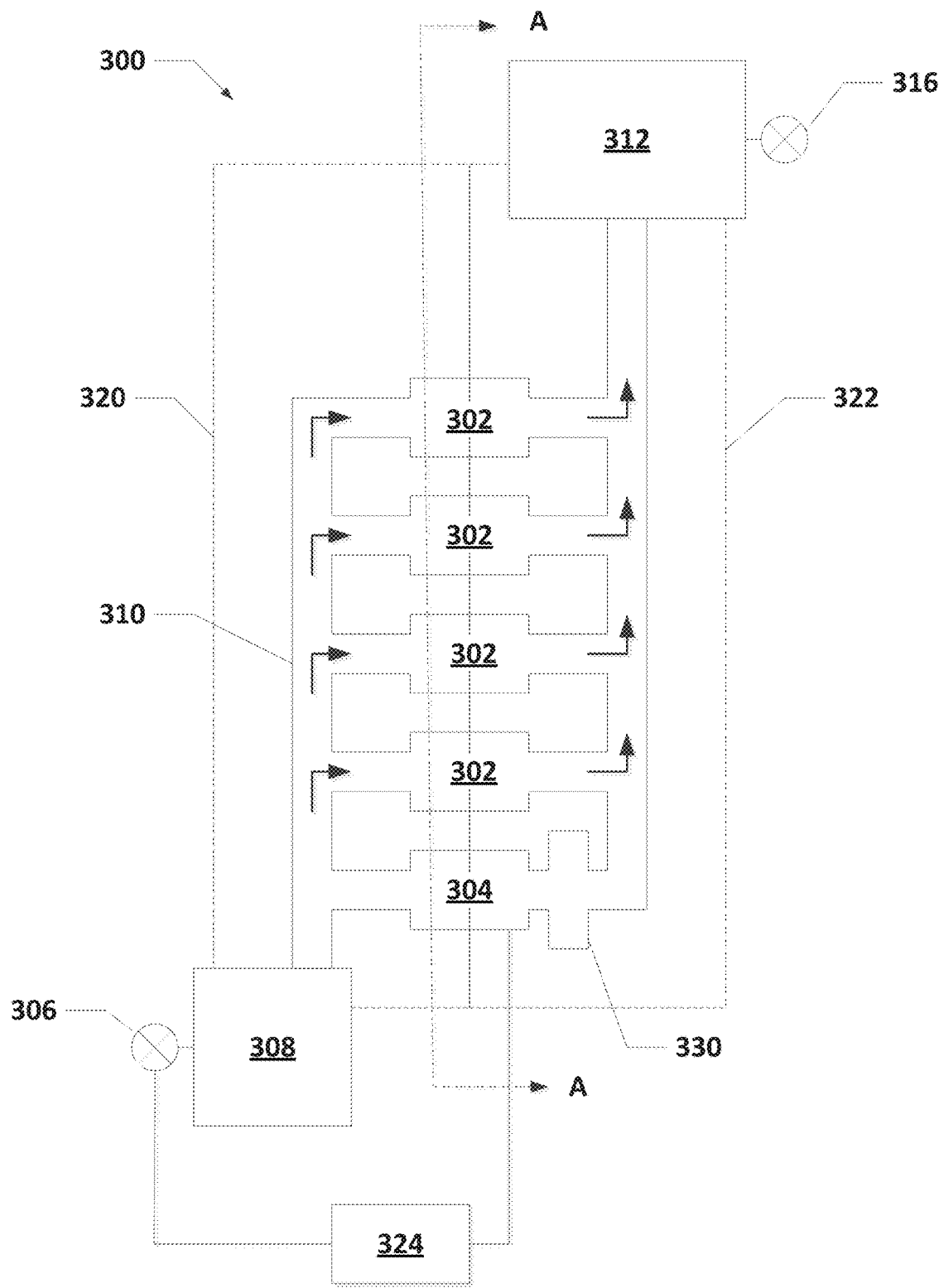
FIG. 3a illustrates an embodiment of a diesel particulate filter, wherein the bypass is closed.
Figure 3B:
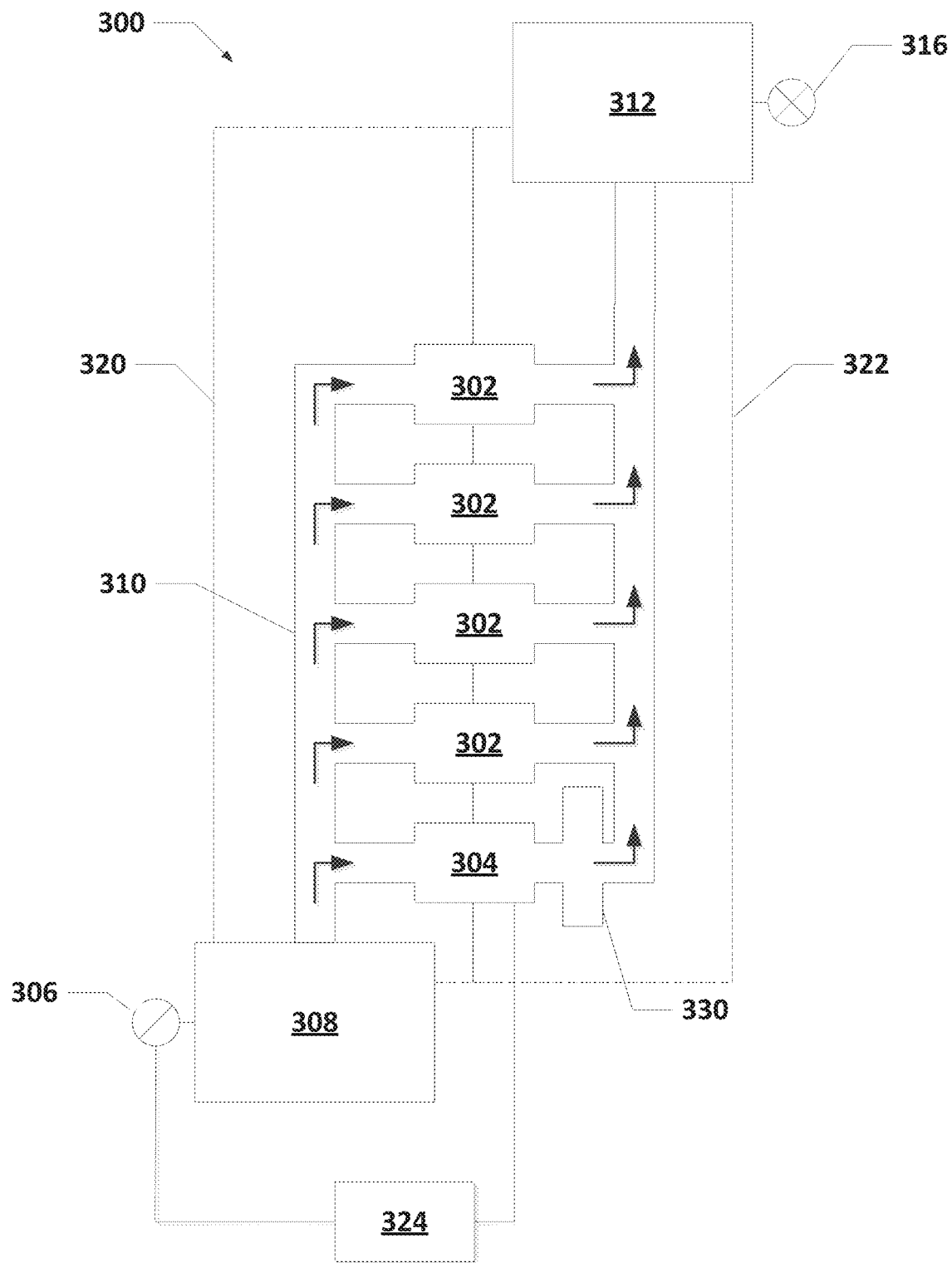
FIG. 3b illustrates the diesel particulate filter of FIG. 3a, wherein the bypass is open.

FIGS. 3a and 3b illustrate an embodiment of a diesel particulate filter system 300 with an internally regulated bypass. FIG. 3a illustrates the system wherein the bypass 304 is closed and FIG. 3b illustrates the system wherein the bypass 304 is open. As illustrated the diesel particulate filter includes four individual diesel particulate filter elements 302 and one exhaust bypass 304. While four filter elements are illustrated in the range of one to 20 filter elements may be present in the diesel particulate filter, including all values and ranges therein, including 4, 5 10, 12, 15, etc., depending on the size of the filter element(s) and the engine requirements. The exhaust passes from the turbocharger exhaust inlet 308 to the outlet 312 through an exhaust path (represented by arrows), which may be understood as one or more conduits through which the exhaust gas is conveyed. The inlet 308 is operatively coupled to the diesel engine as previously described. The diesel particulate filter and its respective elements 302 are positioned in the exhaust path between the inlet 308 and the exhaust gas outlet 312.

A pressure sensor 306, such as a pressure gauge or electronic transducer, is provided in the exhaust inlet 308, which may include a manifold 310 for directing exhaust gas (represented by the arrows) into the diesel particulate filter elements 302. The pressure sensor 306 measures the backpressure present in the inlet portion 320 of the exhaust system, prior to the exhaust passing through the diesel particulate filter elements 302. A second pressure sensor 316 is optionally provided in the exhaust gas outlet 312 to measure the pressure present in the outlet portion 322 of the exhaust system 300. Backpressure of the engine exhaust is generally understood as the pressure that is produced by the engine to overcome the hydraulic resistance of the exhaust system in order to discharge the exhaust gases into the atmosphere. As discussed herein, the backpressure is understood to be the pressure drop across the diesel particulate filter, i.e., as measured between the filter housing inlet 308 and diesel particulate filter elements 302, and may be referenced to the pressure between the filters and exhaust, or the ambient pressure outside of the compartment.

Sensor 306, and optionally sensor 316, may be used to detect and perform a measurement of the pressure present in the exhaust system. Upon determining that a given backpressure value, i.e., a maximum backpressure, or a value greater than the maximum backpressure value, at the inlet side 320 of the exhaust system 300 has been reached, the exhaust bypass 304 is proportionally opened as illustrated in FIG. 3b, such as by controller 324 to maintain the maximum allowable engine backpressure as sensed by 306. The controller 324 may be operated electronically, mechanically, or both. The exhaust gas bypass may be a valve or any other flow modulating design that can be adjusted by the controller 324.

Alternatively, or additionally, a pressure relief valve, such as a pilot operated relief valve may be utilized as the bypass. The pressure relief valve is understood as a valve that is set to open at the maximum back-pressure. In embodiments, the pressure relief valve works in conjunction with the sensors described above, or without the sensors. Further, in embodiments, sensing may be internal to the valve or remote from (i.e., outside of) the valve.

In opening the bypass, a portion of the exhaust gas passes through the diesel particulate filter elements and a portion of the exhaust gas passes around the filter elements and through the bypass opening, which is a completely open flow-through. The portion of the exhaust gas that passes around the filters and through the bypass opening, then passes through the outlet 312 (with the filtered gas) without the benefit of filtration.

Figure 4B:
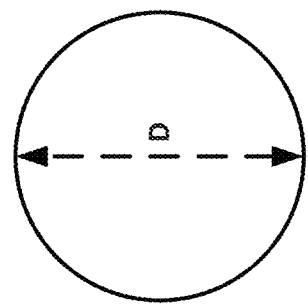
FIG. 4b illustrates a cross-sectional view of the cylinder of FIG. 4a taken at line 4b-4b.
Figure 4A:
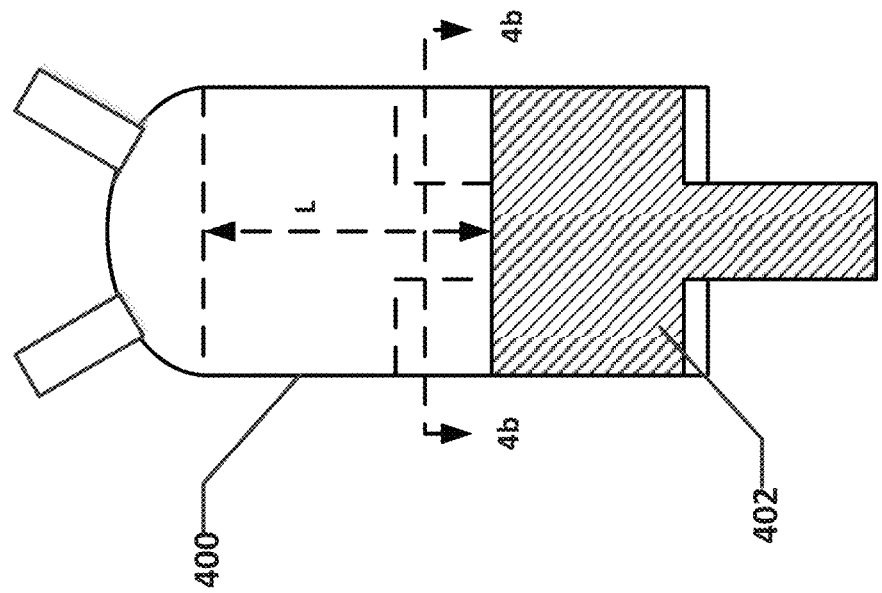
FIG. 4a illustrates a cross-sectional view of a cylinder.

Thus, when the bypass is open, the filtration efficiency is reduced proportional to the amount of exhaust that bypasses the diesel particulate filter elements. The bypass opening preferably provides a cross-sectional area in the range of 1 percent to 100 percent of the area of one of the diesel particulate filter elements, including all values and ranges therein, such as 50 percent to 100 percent, 75 percent to 100 percent, etc., for an engine having a horsepower in the range of 500 or greater, such as from 2,000 to 8,000. Further, in embodiments, the diesel particulate filter elements of the diesel particulate filter exhibit a total volume that is less than 1.9 times the swept volume of the engine, including all values and ranges in between 1 to 1.9 times the swept volume, such as 1.2, 1.5 or 1.7 times the swept volume. As illustrated in FIGS. 4a and 4b, the swept volume of the engine is generally understood as the cross-sectional area of a cylinder 400 (see FIG. 4b which illustrates the cross-sectional area of the cylinder, i.e., cross-sectional area being $\pi*(0.5D)^2$) multiplied by the stroke (L) of the piston 402 within the cylinder (see FIG. 4a), which is then multiplied by the total number of cylinders. Wherein, the swept volume is then equal to $(L*\pi*(0.5D)^2)*n$, wherein n is the number of cylinders. The system allows for full exhaust filtration at idle and light engine power conditions. Then at high engine power, when the exhaust flow is greater than the maximum backpressure capacity, the bypass opens and only a portion of the exhaust is filtered by the diesel particulate filter system.

In embodiments, referring again to FIGS. 3a and 3b, it is contemplated that a diesel oxidation catalyst (DOC) 330 is provided. A DOC is understood as a device including a catalyst that oxidizes hydrocarbons and carbon monoxide into carbon dioxide and water. The catalyst may include, for example, platinum or palladium. As illustrated the diesel oxidation catalyst is positioned in the exhaust path after the bypass 304. However, in embodiments, the diesel oxidation catalyst may be positioned before the bypass 304 so the DOC 330 remains hotter when the bypass 304 is closed.

The diesel particulate filter elements include wall flow filter elements, partial flow filter elements, or combinations thereof. Referring to FIG. 5, an embodiment of a wall flow filter element is illustrated. The filter element 502 includes a plurality of channels 530, 532. A number of channels 530 are sealed at the inlet side 542 of the filter 502 and open at the outlet side of the filter element 544, wherein the outlet side of the filter element opposes the inlet side of the filter element. And the remainder of the channels 532, not sealed at the inlet side 542 or open on the inlet side 542, are sealed at the outlet side 544 of the filter element. The exhaust gas (represented by the arrows) passes into the filter element 502 through the open inlet channels 532. Being blocked by the sealed outlets, the exhaust gas passes through the porous channel walls 536 and into adjacent channels with open outlets 530. Thus, all of the exhaust gas passes through the channel walls 536.

The filter elements may exhibit a diameter in the range of 5 to 20 inches, including all values and ranges therein, and a length in the range of 10 to 40 inches, including all values and ranges therein. In preferred embodiments, the filter elements exhibit a diameter in the range of 10 to 15 inches and a length in the range of 25 to 35 inches. In more preferred embodiments, the filter elements exhibit a diameter of 13 inches and a length of 31 inches.

Figure 6:
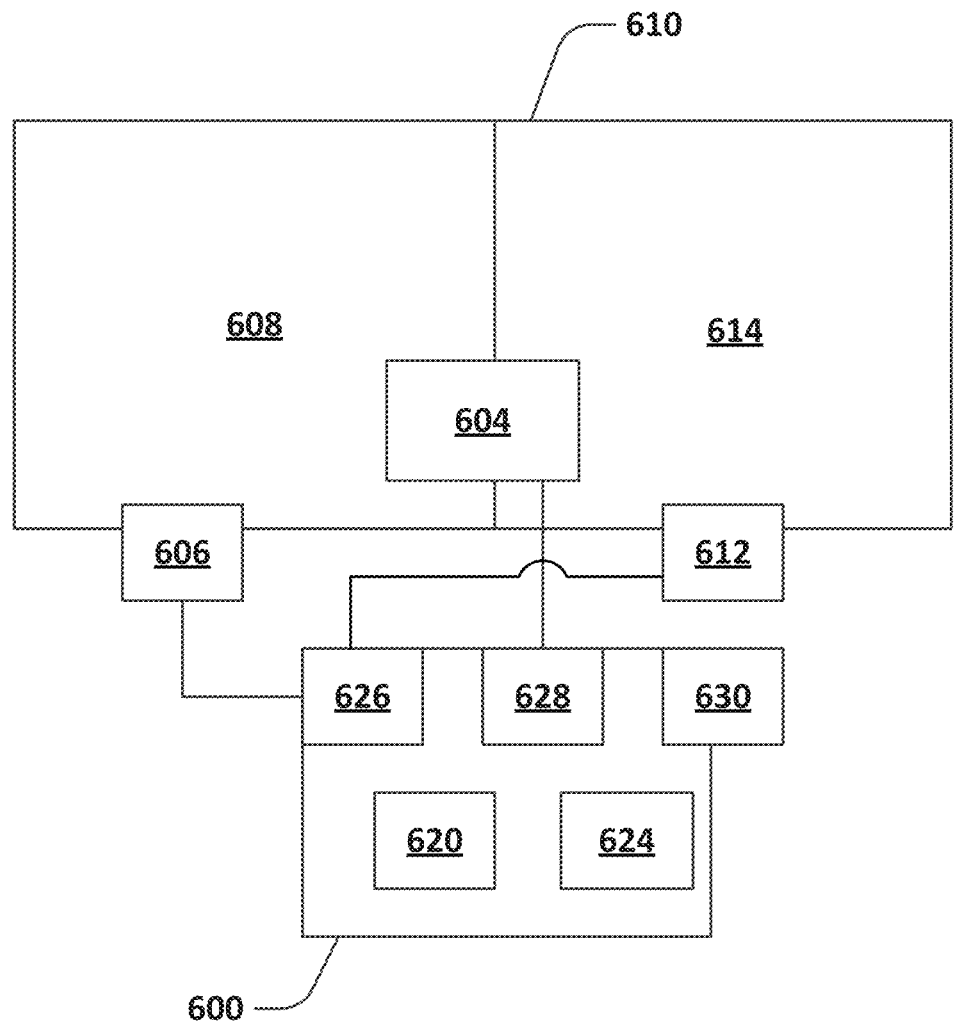
FIG. 6 illustrates an embodiment of a bypass controller and backpressure monitor.

In embodiments, as illustrated in FIG. 6, the controller 600 (referred to above as controller 324 illustrated in FIGS. 3a and 3b) is an electrical controller and the controller 600 receives information from the sensor 606. Information may include one or more signals indicating the pressure present within the inlet portion 608 of the exhaust system 610 between the inlet and diesel particulate filter. As alluded to above, also optionally present is a pressure sensor 612 provided at the outlet 614 of the exhaust system 610. The controller 600 includes a processor 620, memory 624, inputs 626 and outputs 628. The processor 620 may include a microprocessor, central processing unit, application specific instructions-set processor, combinations thereof, etc. Memory 624 or a data storage device may include ROM, RAM, flash memory, or combinations thereof. Inputs may include interfaces, not only information provided by the pressure sensors, but also to items such as a keyboard, mouse, trackball, dial, or other devices used to control or program the controller 600. Outputs may include interfaces, including the exhaust bypass 604, as well as displays 630, such as monitors, LED indicators, digital readouts, etc.

Figure 7A:
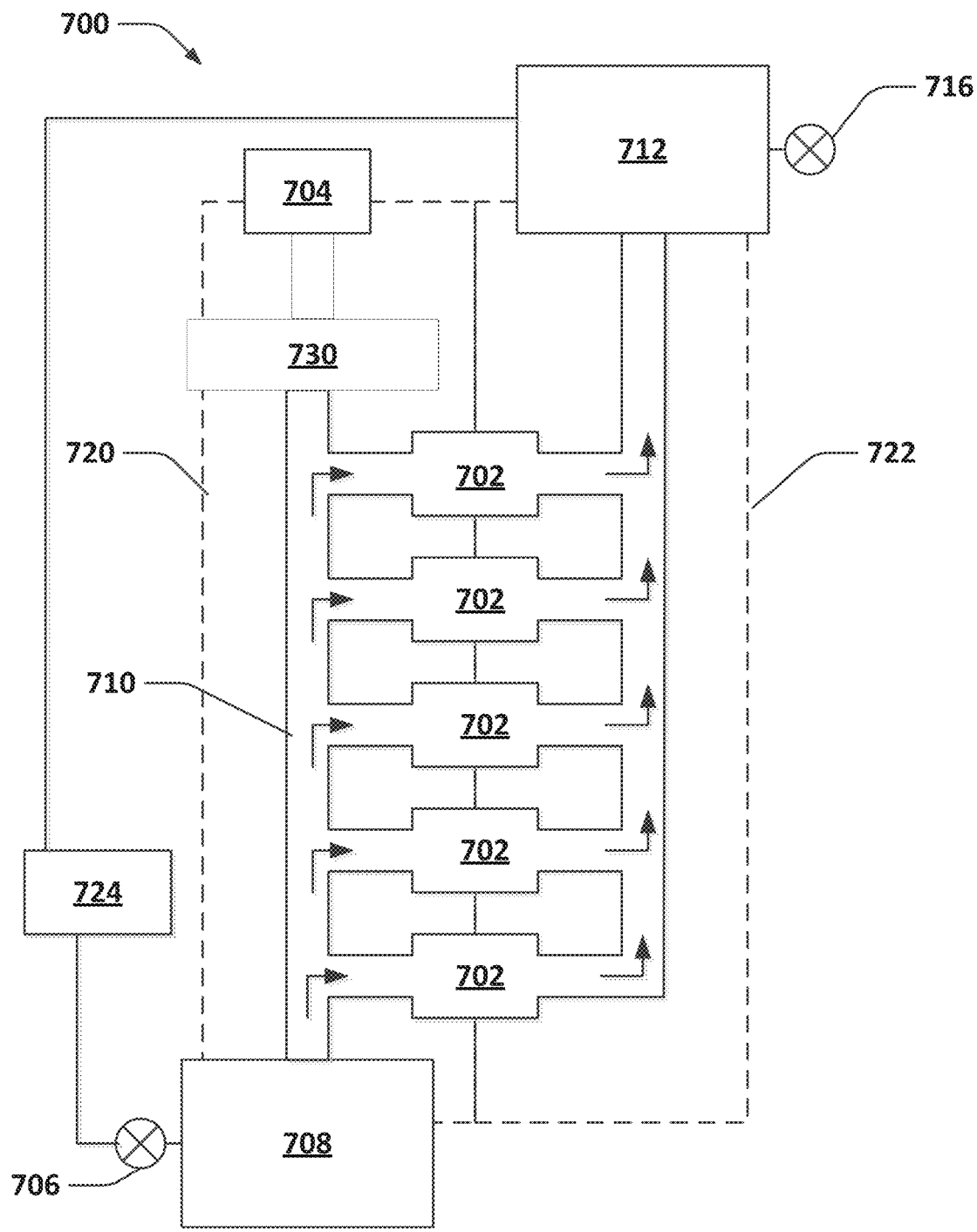
FIG. 7a illustrates another embodiment of a diesel particulate filter, wherein the bypass is closed.
Figure 7B:
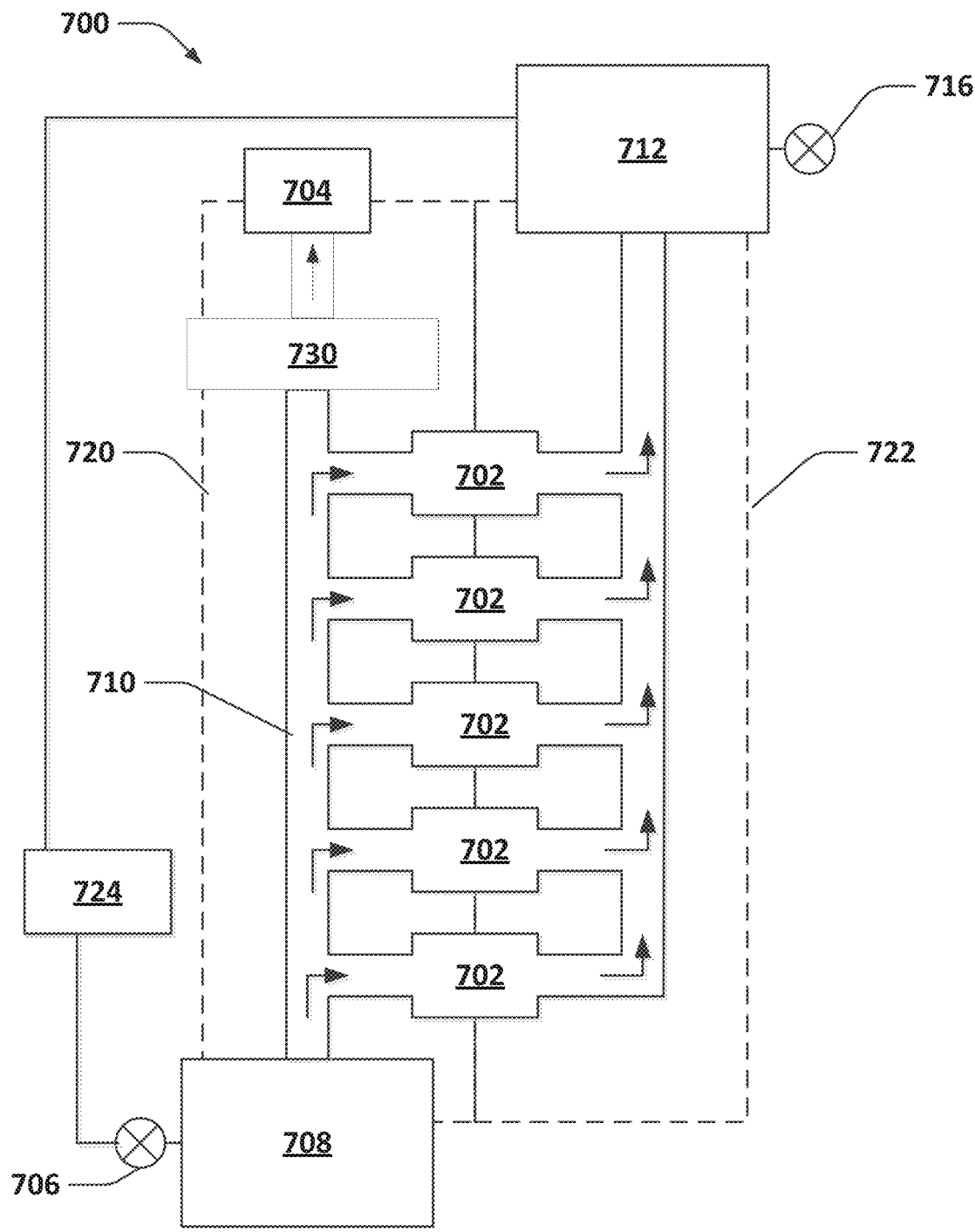
FIG. 7b illustrates the diesel particulate filter of FIG. 6a, wherein the bypass is open.

FIGS. 7a and 7b illustrate another embodiment of a diesel particulate filter system 700 with an externally regulated bypass. FIG. 7a illustrates the system wherein the bypass is closed and FIG. 7b illustrates the system wherein the bypass is open. As illustrated the diesel particulate filter includes five diesel particulate filter elements 702 and one exhaust bypass 704. While five filter elements are illustrated in the range of one to 20 filter elements may be present, including all values and ranges therein, including 4, 5 10, 12, 15, etc., depending on the size of the filter and the engine requirements. The exhaust passes from the exhaust inlet 708 through the diesel particulate filter elements 702 and through the exhaust gas outlet 712.

Similar to the embodiment above, in an engine having a horsepower in the range of 500 to 8,000, the diesel particulate filter elements exhibit a total volume that is less than 1.9 times the swept volume of the engine, including all values and ranges in between 1 to 1.9 times the swept volume, such as 1.2, 1.5 or 1.7 times the swept volume. In particular embodiments, the engine requires from 2 to 22 filter elements 702 provide a total cross-sectional diesel particulate filter housing area in the range of 665 square inches to over 7,670 square inches. This total cross-sectional area being the sum of the individual cross-sectional area of the filters and the additional space needed to mount a plurality of filters in a rectangular space.

A pressure sensor 706, such as a pressure gauge, is provided in the exhaust inlet 708, which may include a manifold 710 for directing exhaust gas (represented by the arrows) into the diesel particulate filter elements 702. The pressure sensor 706 measures the backpressure present in the inlet portion 720 of the exhaust system, prior to the exhaust passing through the diesel particulate filter elements 702. A second pressure sensor 716 is optionally provided in the exhaust gas outlet 712 to measure the pressure present in the outlet portion 722 of the exhaust system 700. Backpressure of the exhaust may generally be understood as the exhaust gas pressure that is produced by the engine to overcome the hydraulic resistance of the exhaust system in order to discharge the exhaust gases into the atmosphere. Again, as discussed herein, the backpressure is understood to be the pressure drop across the diesel particulate filter, i.e., as measured between the turbocharger housing outlet 708, and the diesel particulate filters to include the pressure drop across all of the exhaust plumbing and the diesel particulate filter elements. In embodiments, the pressure may be compared to the pressure between the filter elements and the associated exhaust plumbing and the outlet or ambient pressure outside of the engine compartment.

Sensor 706, and optionally sensor 716, may be used to detect and perform a measurement of the pressure present in the exhaust system. Upon determining that a given pressure value, i.e., maximum backpressure, at the inlet side 720 of the exhaust system 700 has been reached, a controller 724, may open the exhaust bypass 704 as illustrated in FIG. 7b. The controller 724 may be operated electronically, mechanically or both, such as described in FIG. 8. The exhaust gas bypass may be a proportional valve or throttle valve and operated by the controller 724 or by the valve itself. Opening of the bypass forms a second outlet through which a portion of the exhaust gas passes. The exhaust gas passing through the bypass does not have the benefit of filtration or may be passed through a DOC 730 before it is added to the clean exhaust flow, to minimize the PM increase due to the bypass of exhaust around the diesel particulate filter elements. As illustrated, the exhaust gas passes through the DOC prior to entering the bypass. Alternatively, the exhaust gas may pass through the DOC after entering the bypass. However, in either case, when the bypass is open, the filtration efficiency is therefore reduced, and the exhaust backpressure is maintained at the desired level.

Alternatively, or additionally, a pressure relief valve, such as a pilot operated relief valve may be utilized as the bypass. The pressure relief valve is understood as a valve that is set to open at a predetermined or set pressure, i.e., the maximum allowable engine backpressure. In embodiments, the pressure relief valve works in conjunction with the sensors described above, or without the sensors. Further, in embodiments, sensing may be internal to the valve or remote from the valve.

The systems described above remove at least 40 percent of the particulate matter, including all values and ranges therein, such as in the range of 40 percent to 99 percent of the particulate matter. In embodiments, when the bypass remains closed, the system is capable of removing at least 90 percent of the particulate matter, including all values and ranges between 90 percent and 99 percent. And when the bypass opens, the system is capable of removing at least 40 percent of the particulate matter, including all values and increments from 40 percent to 90 percent.

Figure 8:
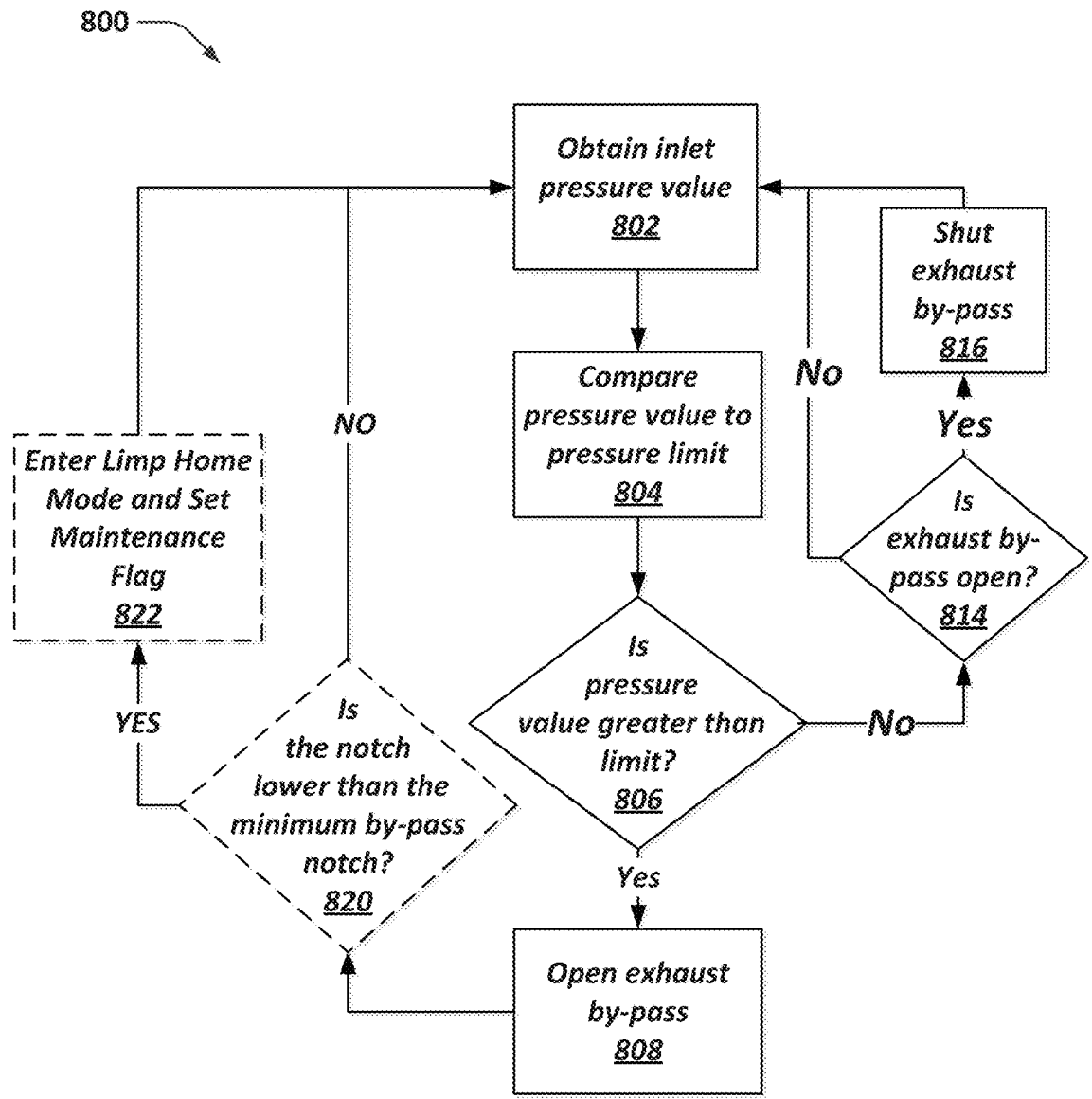
FIG. 8 illustrates an embodiment of a method for determining back-pressure and opening the bypass valve.

Also provided for herein is a method of monitoring and adjusting backpressure using the exhaust gas bypass valve. An embodiment of such a method 800 is illustrated in FIG. 8. Once the engine has been turned on, the method 800 begins with monitoring the backpressure of the exhaust gas in the inlet portion of the exhaust system. An inlet pressure value is obtained 802 by using information provided by the sensor positioned in the exhaust gas inlet or between the inlet and the diesel particulate filter. Then a processor, such as a processor located in the controller seen in FIG. 6, makes a comparison between the pressure values and a pressure limit 804 which would be stored in the memory of the controller. If, upon comparing the pressure value to the pressure limit, it is determined that the pressure value has exceeded the pressure limit at 806, the exhaust bypass is opened at 808 if it is not opened already. Monitoring is continued and the cycle is repeated until the engine is switched off.

In embodiments, the maximum backpressure, i.e., pressure limit, is set based on backpressure values that are understood to be generated at higher loads, when the mass flow through the exhaust system is relatively high. This setting may be determined by modeling and testing and based on factors such as engine size, engine operating conditions (such as engine loads greater than 40 percent), combustion efficiency of a given engine, available fuel formulations, and possibly even the environment in which the engine will be utilized. In embodiments, the pressure limit is set in the range of 0.4 inHg (inches of mercury) to 10 inHg, including all values and ranges therein, such as 2 inHg.

Alternatively, or additionally, while obtaining the inlet pressure at 802, the outlet pressure is obtained using the pressure sensor positioned at the outlet. The controller may make a determination of the difference between the inlet pressure and outlet pressure. The difference may then be compared to a maximum allowable engine backpressure difference stored in memory.

If it is determined that the backpressure is not greater than then limit at 806, a determination is made as to whether the exhaust bypass is opened at 814. If the exhaust bypass is not opened, the method is repeated. If it is determined that the exhaust bypass is opened, the bypass is shut at 816 and the method is repeated. In embodiments, the pressure values may be obtained at intervals, such as every microsecond to every hour, including all values and ranges therein. In such a manner, the system and method provides active backpressure regulation, limiting the maximum backpressure on the engine.

In embodiments of the above, where a pressure relief value is utilized, the valve may open and close on its own without the direction of the controller (passive control).

In any of the above embodiments where the opening and closing of the value is automated by the controller, or is self-regulated, the controller may monitor the opening and closing of the valve and the notch level (i.e., percentage of the total rated load of the engine) that the throttle is at when the valve opens and closes. The information may be stored in memory and used for analysis of the data to determine the condition of the filter elements. As described further below, maintenance flags may be set and compliance with EPA standards may be determined.

As alluded to above, optionally provided is the ability to enter a "limp home" mode. If it is determined that the diesel particulate filter and the individual elements are indeed plugged to a degree that regeneration, such as passive or active, is insufficient to oxidize the accumulated PM in the filter, "limp home" mode is entered. For example, in situations where the maximum backpressure is reached while operating at a notch (i.e., percentage of the total rated load of the engine) lower than expected to trigger maximum backpressure, i.e., the minimum bypass notch (i.e., minimum percentage of the total rated load of the engine), 820, the system will set a maintenance flag providing an indication to the operator or mechanic that the filters 822 are clogged. The locomotive will be able to continue its trip (or mission) until a desired destination is reached. Upon changing of the diesel particulate filter elements or providing another form of remediation, the operator or mechanic may then reset the maintenance flag. Setting a maintenance flag may be understood as providing a visual or audio indicator by way of, for example, light, alarm, printed or displayed codes, etc.

In addition, if the bypass valve is open due to high engine backpressure, but should not be based on operating conditions, it is possible to flag the system for maintenance as described above, as well as monitor for EPA compliance. For example, if the engine is operating a relatively low notch (such as below notch 5 or less than 50 percent of the rated engine power), and the engine backpressure bypass opens, an alarm is triggered. This would then cause the locomotive to enter "limp home" mode. The number of times the flag is set, the amount of time for which the flag is set or the distance traveled while the flag is set may be logged to capture whether the overall exhaust particulate matter is compliant with applicable emissions regulations.

By monitoring backpressure, and controlling the filtration of exhaust based on backpressure, the system may provide at least partial filtration at relatively higher loads, greater than 40 percent of the rated load of the engine. The system may therefore function as a passive backpressure regulator, limiting maximum backpressure on the engine. In addition, the system and method provides for full-flow or full filtration of all the diesel exhaust through the diesel particulate filtration at idle and low loads, wherein the engine is operating at 40 percent of the rated loads or less. This is particularly important when idling or operating at low loads in urban environments, such as urban switch yards.

It is also noted that crankcase overpressure trip/safety switch functionality is maintained. This may be relatively important for engines that route the crankcase ventilation system into the exhaust as is common practice on medium-speed locomotive and marine engines. When after-treatment systems are installed downstream of the point that the crankcase ventilation system enters the exhaust, the crankcase operates at a higher pressure, in proportion to the engine exhaust backpressure. If the exhaust backpressure goes to high, this will also increase the crankcase pressure, which can in turn trip a crankcase overpressure safety switch that will shut down the engine. Thus, the predetermined back-pressure limit may be set to a value that is lower than the crankcase overpressure safety switch setting. In monitoring the engine backpressure as provided in the systems and methods herein, faults tripped due to relatively high backpressure may be reduced or eliminated.

By selectively adjusting the amount of exhaust that passes through the diesel particulate filter as described using the systems and methods above, the size, i.e., cross-sectional area, of the diesel particulate filter elements may be significantly smaller as compared to a filter element sized for a diesel particulate filter system designed to not exceed the engine manufactures maximum backpressure limit wherein all of the exhaust gases is filtered regardless of operating condition. Thus, the filter packaging for the systems provided herein is relatively smaller than that of systems that do not include a bypass and filter all of the exhaust. This better allows the diesel particulate filter elements to be positioned within the limited space of the engine compartment.

In addition, in utilizing the systems and methods described above, operation of the locomotive may be continued, even when the diesel particulate filter elements are plugged, so that the locomotive may reach its destination, without blocking the rail line where it can be repaired. Furthermore, with the above described monitoring, EPA compliance may be tracked and better assured.

The methods herein may be executed by the controller described above with reference to FIG. 6. The operations described herein may be implemented in a controller that includes one or more tangible storage mediums, memory, having stored thereon, individually or in combination, instructions that when executed by one or more processors perform the methods. Again, the processor may include, for example, a system CPU and/or other programmable circuitry. Also, it is intended that operations described herein may be distributed across a plurality of physical devices, such as processing structures at more than one different physical locations. The storage medium, memory, may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

EXAMPLES

To examine the effect of the partial flow exhaust system described herein on exhaust backpressure and emissions, a 4,000 HP, 4-stroke, medium speed diesel engine, a GE 16 cylinder FDL was used with a partial flow exhaust system illustrated in FIGS. 3a and 3b. Measurements of backpressure and emissions were made at various operation points or conditions, including idle, dynamic braking 2, and notches 1 through 8. The percent of maximum power for each of these operating conditions is set forth in Table 1 below.

TABLE 1

Percent of Maximum Power for Each Operating Condition

| Operating Condition (Notch) | Percent of Maximum Power (%) |
|---|---|
| Idle | 0.3 |
| DB2 | 1 |
| 1 | 4 |
| 2 | 10 |
| 3 | 30 |
| 4 | 40 |
| 5 | 55 |
| 6 | 72 |
| 7 | 90 |
| 8 | 100 |

Exhaust Backpressure

Figure 9:
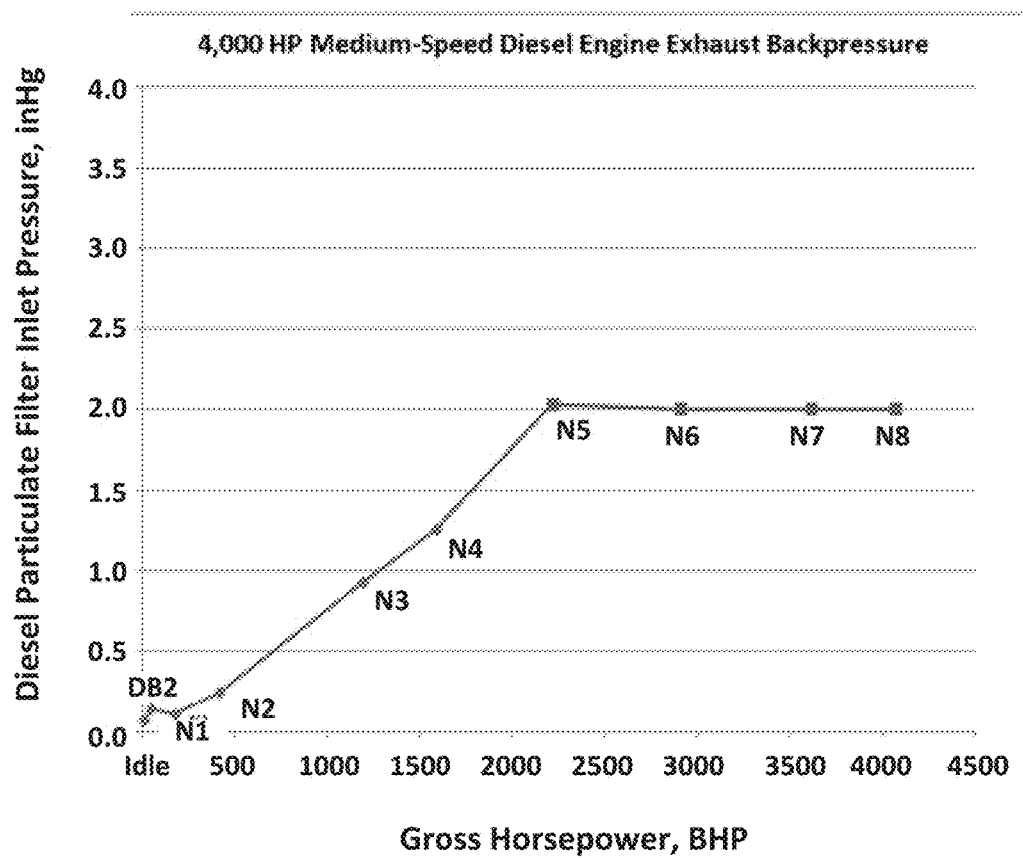
FIG. 9 illustrates an example of diesel particulate filter inlet pressure as a function of throttle notch for an embodiment of a diesel particulate filter.

FIG. 9 illustrates the effect of operating conditions and gross power on the diesel particulate filter inlet pressure. In this example, the system was set to allow a portion of the exhaust to bypass diesel particulate filtration when the inlet pressure of the diesel particulate filter reached 2.0 inHg [gauge]. As seen in the graph, the inlet pressure generally increased steadily with increasing horsepower until the bypass was activated at notch 5, or approximately 2,212 HP (55 percent of rated power).

Particulate Matter

Figure 10:
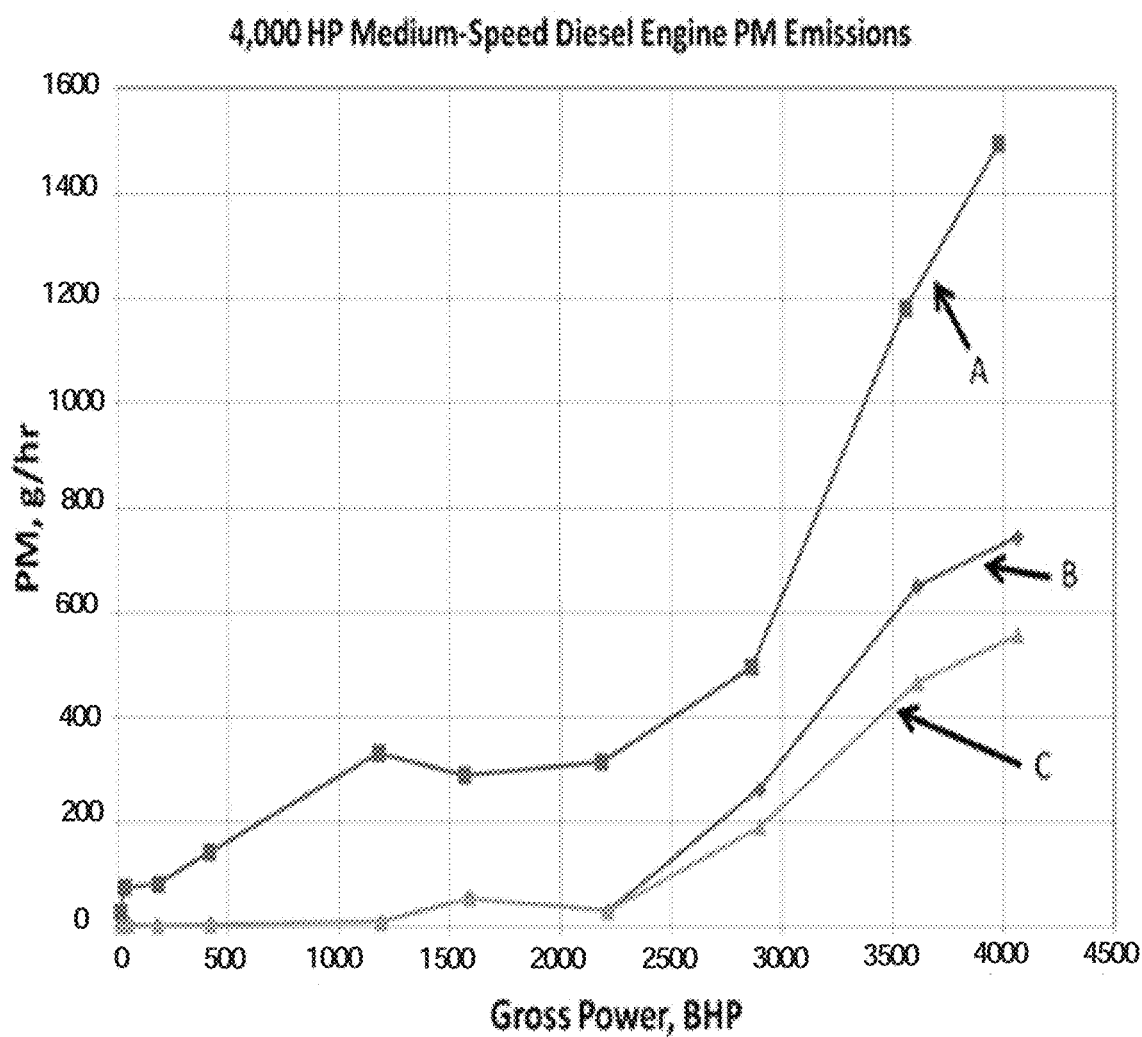
FIG. 10 illustrates the particulate matter emitted, in grams per hour, by a diesel engine operating at various levels of horsepower without filtration (Line A), with the diesel particulate filter in place and the bypass operating above 2500 BHP (Line B), and the diesel particulate filter in place and the bypass operating, with DOC mounted in the bypass circuit, above 2500 BHP (Line C)

FIG. 10 illustrates the effect of operating conditions and gross power on particulate matter emissions. The system was tested up to 2,212 HP without an exhaust bypass using ten catalyzed diesel particulate filter elements. Above 2,212 HP a blanking plate in the diesel particulate filter housing was removed creating a leak of 1/11 the size of flow area of the remaining diesel particulate filters, which formed the exhaust bypass. Stated another way 10 diesel particulate filter elements were provided with one opening having the same cross-sectional area of the individual diesel particulate filters.

Line A in the figure illustrates the engine out particulate matter emissions without filtration, i.e., prior to entering the diesel particulate filtration system, and Line B illustrates emissions after filtration. Line C represents the potential of using a DOC in the bypass circuit and assuming a 40% particulate matter reduction across the DOC. The particulate matter filtration efficiency of the system was greater than 90 percent from idle up to 2,212 HP (notch 5). When operating above notch 5, or 2,212 HP, and a bypass in the diesel particulate filter was opened, the particulate matter filtration efficiency of ranged from 45 to 50 percent without the DOC in the bypass circuit and 64 to 67 percent with a 40% efficient DOC in the bypass circuit. In this example, the duty-cycle weight particulate matter filtration reduction was 59 percent for an EPA locomotive line-haul cycle, and was 84 percent for an EPA switch cycle and with the DOC in the bypass circuit the EPA switcher cycle the duty-cycle weight particulate matter filtration reduction was 69 percent for an EPA locomotive line-haul cycle, and was 87 percent for an EPA switch cycle. The maintaining the high system filtration efficiency over the EPA switch cycle is relatively important for operations in urban areas. Table 2 includes the data.

TABLE 2

Data illustrated in FIG. 10

| Gross HP | Particulate Matter Reduction (%) Without DOC in Bypass Circuit | Particulate Matter Reduction (%) With DOC in Bypass Circuit |
|---|---|---|
| 12 | −91 | −91 |
| 45 | −93 | −93 |
| 177 | −96 | −96 |
| 418 | −97 | −97 |
| 1189 | −97 | −97 |
| 1586 | −81 | −81 |
| 2213 | −90 | −90 |
| 2899 | −47 | −65 |
| 3607 | −45 | −64 |
| 4062 | −50 | −67 |

It is noted that the diesel particulate filter housing was sized for a 2,000 HP diesel engine, and with a single element bypass, was able to achieve 4,000 HP at acceptable engine backpressure levels.

Contemplated Example Illustrating Change in Filter Area Needed According to Percentage of Exhaust Gas Flow Through Filter For an engine that may have a 4,500 horsepower rating, one or more filter elements provide a total cross-sectional area in the range of 125 square inch for a single element to 4,880 square inch for a total of 14 DPF elements mounted in an appropriately sized housing. A number of assumptions were made for the sizing of the DPF system. These assumptions used in the following example are:

A single DPF filter element can be fitted on an engine of 350 to 400 horsepower (anything larger requires multiple elements);

Some of the largest DPF elements produced today include those cylindrical in shape and approximately 13 inch in diameter and are approximately 31 inches long, for a total volume of approximately 4,115 cubic inch;

To place multiple elements in a rectangular housing, it is understood that a spacing of 3 inches is needed between the edge of the housing and the elements and each of the elements;

To minimize the cross sectional size of the DPF housing that houses the DPF elements, the elements can be placed in a "hexagonal packing of circles" configuration; and In this example, the engine is rated at 4,500 horsepower and will accept the same maximum backpressure as the 350 horsepower engine that the DPF element was originally designed to operate.

Figure 11:
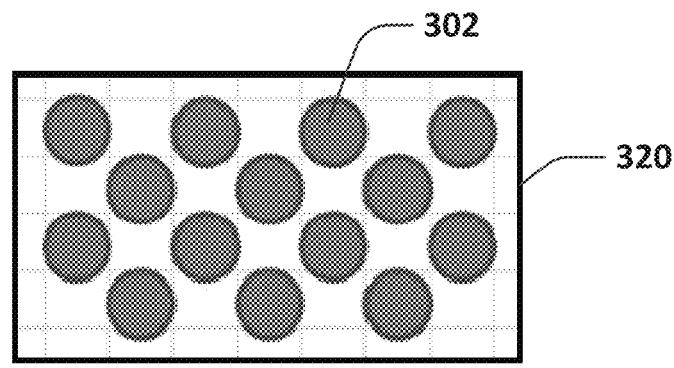
FIG. 11 illustrates an embodiment of a diesel particulate filter system wherein all of the exhaust gas is filtered.

Based on these assumptions, the diesel particulate filter housing, such as that illustrated in FIG. 3a, 320, would require approximately 14 filter elements 302 to filter the exhaust flow of the 4,500 horsepower engine. If these filter elements 302 are packed in a "hexagonal" packing of circles configuration, one option would be to place them in a pattern that will fit into a rectangle, as shown in FIG. 11 (taken at cross-section A-A of FIG. 3a), that would have a total cross sectional area of 4,880 square inch.

Figure 12:
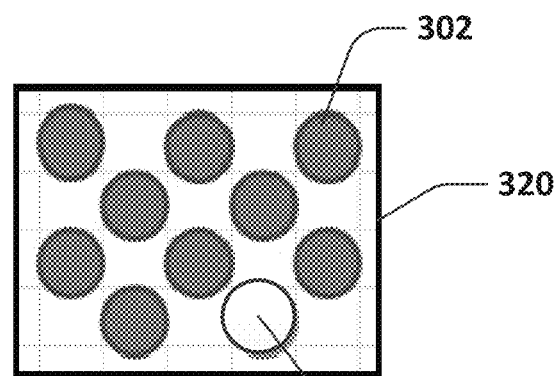
FIG. 12 illustrates an embodiment of a diesel particulate filter system wherein 75 percent of the exhaust gas is filtered.

If the system is designed to allow roughly 75 percent of the exhaust gas to flow through the diesel particulate filter elements 302, before a bypass valve 304 is opened, then only 9 filter elements would be required along with one bypass valve 304 assumed to be the same frontal area of one of the elements 302 (total spaces needed would be the equivalent of 10 elements). Using the same hexagonal packing pattern, as shown in FIG. 12, the rectangular cross sectional area of the diesel particulate filter housing 320 (located in FIG. 3a, View A-A) could be reduced to 3,607 square inch which would offer a twenty six percent reduction in cross sectional area from the layout shown in FIG. 11.

Figure 13:
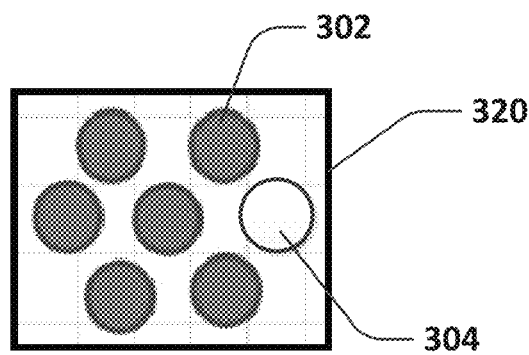
FIG. 13 illustrates an embodiment of a diesel particulate filter system wherein 50 percent of the exhaust gas is filtered.

If the system is designed to allow 50 percent of the exhaust gas to flow through the diesel particulate filter elements 302, before a bypass valve 304 is opened, then only 6 elements 302 will be required along with one bypass valve 304 of the same size of one of the elements (total spaces needed would be equivalent to 7 elements). Using the hexagonal packing pattern, as shown in FIG. 13, the rectangle cross section area of the diesel particulate filter housing 320 (located in FIG. 3a, View A-A) could be reduced to 2,249 square inch or a 54 percent reduction in cross sectional area of the diesel particulate filter housing 320 when compared to the layout for 14 elements 302 shown in FIG. 11.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A system for particulate matter reduction, comprising:
a diesel particulate filtration system, wherein said diesel particulate filtration system includes an inlet, a first outlet, and an exhaust path between said inlet and said first outlet, 1 to 20 diesel particulate filter elements positioned in said exhaust path between said inlet and said first outlet, a maintenance flag indicator, and a bypass valve having an opening providing a cross-section area in the range of one to 100 percent of said 1 to 20 diesel particulate filter elements,
wherein said diesel particulate filtration system is configured to have a diesel engine having a horsepower of 500 or greater operatively coupled to said inlet and said 1 to 20 diesel particulate filter elements have a total volume that is less than 1.9 times a swept volume of said diesel engine wherein said diesel engine provides a maximum allowable engine backpressure in the range of 0.4 in Hg to 10 in Hg
wherein said bypass valve is configured to open when said maximum allowable engine backpressure in the range of 0.4 in Hg to 10 in Hg is exceeded,
wherein said system further comprising a controller with control program logic that is configured to perform the steps of considering whether said maximum allowable engine backpressure is reached while operating at an engine load lower than expected to reach said maximum allowable backpressure and setting said maintenance flag indicator indicating said 1 to 20 diesel particulate filter elements are clogged when said maximum allowable backpressure is reached operating at said lower than expected engine load,
wherein when said bypass valve is closed, exhaust gas including particulate matter passes through said 1 to 20 diesel particulate filter elements and said diesel particulate filtration system removes at least 90 percent of said particulate matter from said exhaust gas, and
when said bypass valve is open, a portion of said exhaust gas passes through said 1 to 20 diesel particulate filter elements and a remainder of said exhaust gas passes through said bypass valve without the benefit of filtration wherein said diesel particulate filtration system removes at least 40 percent of said particulate matter from said exhaust gas.

2. The system of claim 1, further comprising a diesel oxidation catalyst coupled to said exhaust path upstream from said bypass valve wherein said remainder of said exhaust gas passes through said diesel oxidation catalyst.

3. The system of claim 1, further comprising an exhaust manifold, wherein said 1 to 20 diesel particulate filter elements are operatively coupled to the diesel engine via said exhaust manifold.

4. The system of claim 1, wherein said bypass valve comprises a pressure relief valve.

5. The system of claim 1, wherein said bypass valve is positioned between said inlet and said first outlet.

6. The system of claim 1, wherein said bypass valve is configured to provide a second outlet separated from said first outlet in said diesel particulate filtration system.

7. The system of claim 1, further comprising a pressure sensor coupled to said exhaust path between said inlet and said 1 to 20 diesel particulate filter elements.

8. The system of claim 7, wherein said controller is configured to open and close said bypass valve based on a pressure value determined from information received from said pressure sensor.

9. The system of claim 7, wherein said controller is configured to store in memory an engine load when said bypass valve is opened and closed.

10. The system of claim 1, wherein when said bypass valve is open said 1 to 20 diesel particulate filter elements remove in the range of 40 percent to 90 percent of said particulate matter in said exhaust gas.

11. The system of claim 1, wherein said 1 to 20 diesel particulate filter elements comprise a wall flow filter element or a partial flow filter element.

12. The system of claim 1, wherein said diesel engine and said diesel particulate filtration system are located within a locomotive, marine, or off-highway equipment compartment.

13. The system of claim 1, wherein said bypass valve is a pilot operated relief valve.

14. The method of claim 1, wherein said system is configured to enter a "limp home" mode being performed by said controller with control program logic when said maximum allowable engine back pressure is triggered while operating at an engine load lower than said minimum by-pass engine load.

15. A method of reducing particulate matter, comprising:
operating a diesel engine having a horsepower of 500 or greater, wherein said diesel engine is operatively coupled to an inlet of a diesel particulate filtration system, wherein said diesel particulate filtration system further includes a first outlet, an exhaust path between said inlet and said first outlet, 1 to 20 diesel particulate filter elements positioned between said inlet and said first outlet, and a bypass valve having an opening providing a cross-sectional area in the range of one percent to 100 percent of one of said 1-20 diesel particulate filter elements, wherein said 1 to 20 diesel particulate filter elements have a total volume that is less than 1.9 times a swept volume of said diesel engine and wherein said diesel engine provides a maximum allowable engine backpressure in the range of 0.4 in Hg to 10 in Hg;
directing exhaust gas including particulate material generated by said diesel engine through said exhaust path;
measuring backpressure in said exhaust path between said inlet and said 1 to 20 diesel particulate filter elements with a sensor;
determining if said backpressure exceeds said maximum allowable engine backpressure in the range of 0.4 in Hg to 10 in Hg and when said backpressure exceeds a maximum allowable engine backpressure, determining if said maximum allowable engine back pressure is reached when operating at an engine load lower than expected to reach said maximum allowable engine backpressure; and
opening said bypass valve when said backpressure is determined to be above said maximum allowable engine backpressure, wherein at least 40 percent of said particulate material is removed from said exhaust gas by said diesel particulate filtration system when said bypass valve is open and a portion of said exhaust gas passes through said bypass valve without the benefit of filtration, and
setting a maintenance flag indicating that said 1 to 20 diesel particulate filter elements are clogged if it is determined that said maximum allowable engine backpressure was reached while operating at said engine load lower than expected to reach said maximum allowable engine backpressure.

16. The method of claim 15, further comprising a diesel oxidation catalyst coupled to said exhaust path upstream of said bypass valve and passing said exhaust gas through said exhaust path.

17. The method of claim 15, wherein said sensor is in communication with a controller.

18. The method of claim 17, wherein said controller is configured to compare said backpressure with said maximum allowable engine backpressure and open and close said bypass valve.

19. The method of claim 15, wherein said engine load is a function of a notch value.

20. The method of claim 15, wherein said diesel engine and said diesel particulate filtration system are located within a locomotive, marine, or off-highway equipment compartment.

21. The method of claim 15, further comprising the step of entering a limp home mode when said maximum allowable engine back pressure is triggered while operating at an engine load lower than said minimum by-pass engine load.

* * * * *